Patented Nov. 25, 1952

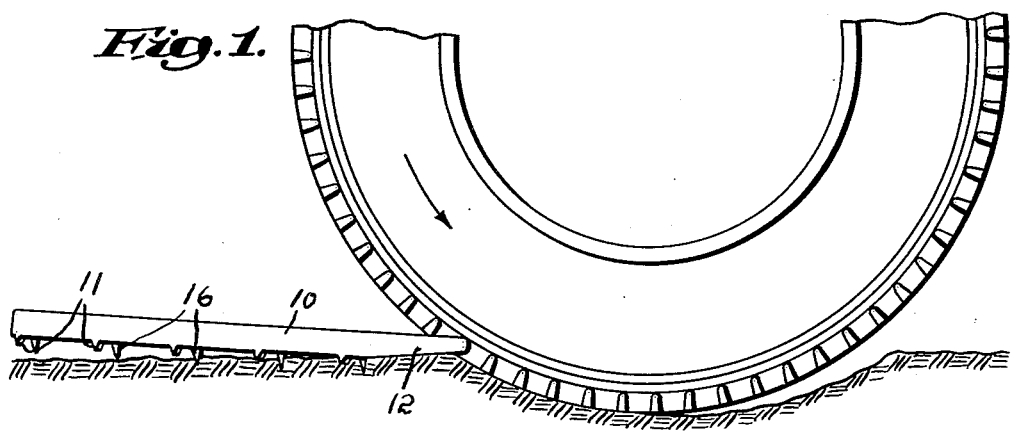
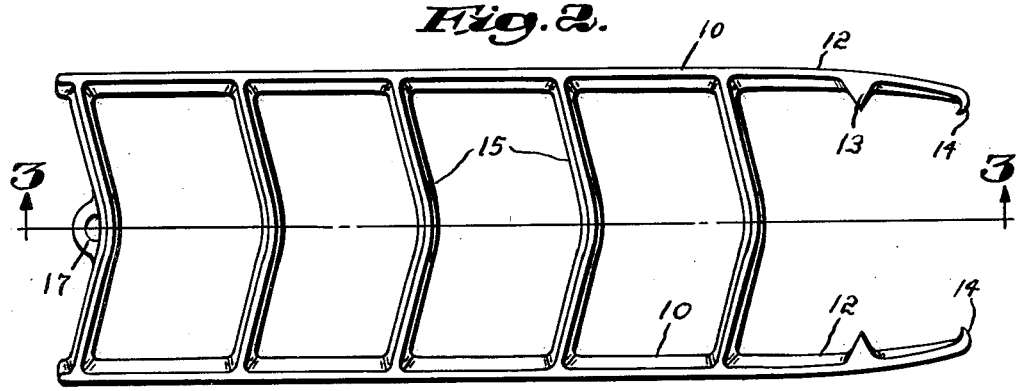
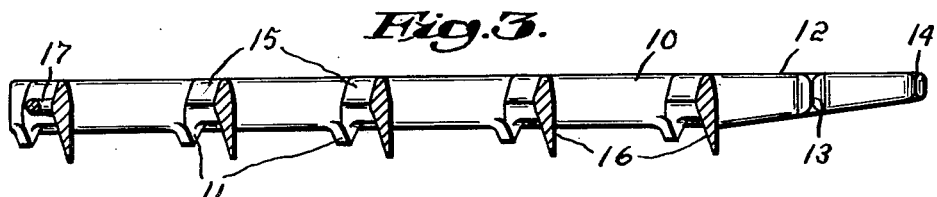
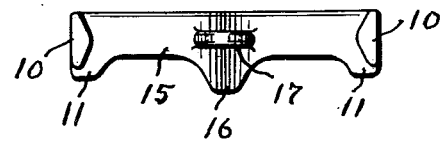

2,619,289

UNITED STATES PATENT OFFICE 2,619,289

ICE GRIP FOR MOTOR VEHICLES

Henry Plante, Saco, Maine

Application April 1, 1948, Serial No. 18,425

3 Claims. (Cl. 238—14)

This invention relates to an ice gripping device for motor vehicles and the object is to provide means by use of which a motor car may be driven away from an icy or slippery patch or spot without the necessity of employing jacks or the assistance of other persons and without the use of tension or traction chains.

A further object is to provide a strong and durable device of small size and light weight, being formed as a single casting, so that a pair of these devices may be readily carried at all times in any motor car and effectively used.

A still further object is to provide a device which requires no mechanical adjustment, no assembling of parts and made so simple that any person may effectively insert the same for use without meditation or strenuous efforts, for the device is so designed that, after placing in front of the vehicle's rear wheel, upon the slightest forward motion of the wheel, the device self-engages itself, thereby being drawn under the wheel, providing the necessary momentum, created by the tractive transverse bars, to start the vehicle on its way.

In accordance with the invention, a light weight ice grip of convenient size to accomplish these objectives consists of a pair of side rails rigidly interconnected by a plurality of spaced transverse members. Usually, both the side rails and the transverse members are provided with ground engaging calks. The width of the ice grip is greater than that of the tread portion of the tire and the front end of each side rail includes a portion terminating in a tip inwardly disposed towards the other side rail to establish a forked entrance. That entrance is of such width that the tips engage the sides of the tread portion of the tire thereby to enable the grip to be manually positioned against the ground with the tips in engagement with said tread portion sides so that the grip will be pulled by rotation of the wheel in a direction to advance it along the grip to bring the adjacent cross member into a position to be engaged by and anchored by the wheel and ground.

In the drawings an illustrative embodiment of the invention is shown from which these and other of its novel features and advantages will be readily apparent.

In the drawings:

Figure 1 is a side elevation of the ice grip engaged with the tire of a motor vehicle wheel to be drawn thereunder.

Figure 2 is a top plan view of the ice grip.

Figure 3 is a section along the lines 3—3 of Figure 2, and Figure 4 is a view of the ice grip as viewed from its rear end.

In the embodiment of my invention illustrated by the drawings, I have shown my device as consisting of a pair of side rails 10 each of which has a series of ground engaging calks 11 rearwardly of its front end part 12, the bottom surface of which part being forwardly and upwardly inclined. The part 12 of each side rail 10 has, on its inner edge, a projection or knob 13 and an inwardly curved extremity or tip 14.

The side rails 10 are interconnected, rearwardly of their parts 12, by a series of cross bars 15. The cross bars 15 are preferably V-shaped and have their apexes disposed towards the front of the device to assist in maintaining the motor wheel in engagement therewith as it travels therealong. I form each cross bar 15 with a ground engaging calk 16 and provide the rearmost cross bar 15 with an eye 17 by which a rope, for example, may be attached thereto for maximum ease and convenience in picking up the device after use.

The cross bars 15 are of such length as to space apart the tips 15 to engage with the sides of the tread portions of a tire as shown in Fig. 1 and hence, the main part of each device is appreciably wider than said tread portion.

Such a traction device is easy to use and is positive in its operation whether the motor vehicle is stuck due to ice or because of muddy conditions. In either case, one of my traction devices is thrust from either the front or the back of the wheel, depending on whether the driver wishes to move his vehicle forwardly or rearwardly, to bring its tips 14 against the sides of the tread portions of the tire as suggested in Fig. 1 so that the tips 14 engage therewith. In so doing, the taper of the front parts 12 of the side rails 10, enables those parts to be slid along the road surface without engagement of the calks 11 or 16 therewith.

Such manually effected initial engagement between the tips 14 of one of my devices and the sides of the tread portions of a tire ensures its proper positioning when the wheel rotates for only short movement of the device is required before the projections 13 are engaged and, as will be apparent from Fig. 2, these are spaced apart a distance slightly greater than the tips 14. As a consequence, the device is drawn and held under the wheel so that the cross bars 15 are presented for the wheel to travel therealong with the calks being driven into the ice or ground by the weight thereof before the tips 14 become disengaged thereby to ensure the needed traction when the wheel passes over remaining cross bars 15 of the thus anchored device.

As each of my traction devices is preferably an integral casting, it will be appreciated that they are inexpensive to manufacture, and while of light weight are durable as well as being simple and easy to use.

What I claim is:

1. An ice grip for a tire on a motor vehicle wheel, said grip comprising a pair of side rails, a plurality of spaced transverse members rigidly connecting said rails in such spaced relationship that the width of said grip is greater than that of the tread portion of the tire and including at least one ground engaging calk, the front end of each of said rails including tips and a portion inwardly disposed towards the other to establish a forked entrance of such width that the tips of said portions engage the sides of said tread portion thereby to enable said grip to be manually positioned against the ground with said tips in engagement with said tread portion side so that said grip is pulled by rotation of the wheel in a direction to advance along said grip to bring the adjacent transverse member into a position to be engaged by and anchored by the wheel and ground.

2. An ice grip for a tire on a motor vehicle wheel, said grip comprising a pair of side rails and a plurality of spaced transverse rails connecting said side rails to establish a wheel supporting frame of a width greater than the tread portion of the tire, said frame including ground anchoring calks, the front end of each side rail being disposed inwardly towards the other with their extremities being spaced apart an appropriate distance to engage with the sides of said tread portion so that said grip may be manually attached to said tire in a position to be drawn under the wheel by its rotation in a direction to advance along said grip to bring the adjacent transverse member into a position to be engaged and the grip anchored by the wheel and ground.

3. The ice grip of claim 2 in which the front end of each side rail tapers upwardly relative to the bottom surface of the main part thereof.

HENRY PLANTE.

REFERENCES CITED

The following references are of record in the file of this patent:

UNITED STATES PATENTS

| Number | Name | Date |
| --- | --- | --- |
| 1,389,400 | Tufts | Aug. 30, 1921 |
| 1,400,478 | Deschamps | Dec. 13, 1921 |
| 1,868,942 | Hoffman | July 26, 1932 |
| 2,058,192 | Turulis | Oct. 20, 1936 |
| 2,190,195 | Schivinc | Feb. 13, 1940 |